(12) United States Patent
Asher (10) Patent No.: US 8,824,455 B1
(45) Date of Patent: Sep. 2, 2014

(54) METHOD AND APPARATUS FOR PROVIDING USER METADATA EXCHANGE DURING CALL SETUP

(75) Inventor: Michael L. Asher, Green Cove Springs, FL (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1576 days.

(21) Appl. No.: 11/647,740

(22) Filed: Dec. 29, 2006

(51) Int. Cl.
- H04L 12/16 (2006.01)
- H04L 12/28 (2006.01)
- H04B 3/30 (2006.01)
- G01R 31/08 (2006.01)
- H04L 29/06 (2006.01)
- H04L 9/32 (2006.01)

(52) U.S. Cl.
CPC ....... *H04L 65/1069* (2013.01); *H04L 29/06197* (2013.01); *H04L 65/1016* (2013.01); *H04L 9/32* (2013.01); *H04L 29/06027* (2013.01); *H04L 65/1006* (2013.01)

USPC ......... 370/352; 370/260; 370/385; 370/395.2

(58) Field of Classification Search
None
See application file for complete search history.

(56) References Cited

U.S. PATENT DOCUMENTS

| | | | |
|---|---|---|---|
| 6,766,007 B1* | 7/2004 | Dermler et al. | 379/201.01 |
| 2003/0063590 A1* | 4/2003 | Mohan et al. | 370/338 |
| 2004/0037396 A1* | 2/2004 | Gray et al. | 379/67.1 |
| 2004/0202303 A1* | 10/2004 | Costa-Requena et al. | 379/205.01 |
| 2006/0044407 A1* | 3/2006 | Barbeau | 348/211.3 |

* cited by examiner

*Primary Examiner* — Faruk Hamza
*Assistant Examiner* — Thinh Tran (57) ABSTRACT

A method and apparatus for enabling a calling party and a called party to exchange useful information with each other during a call setup process are disclosed. For example, the method receives user metadata from an originating party, and sends the user metadata provided by the originating party by embedding the user metadata in a Session Initiation Protocol (SIP) signaling message during a call setup.

9 Claims, 5 Drawing Sheets

METHOD AND APPARATUS FOR PROVIDING USER METADATA EXCHANGE DURING CALL SETUP

The present invention relates generally to communication networks and, more particularly, to a method and apparatus for providing user metadata exchange during call setup in communication networks, e.g., packet networks such as Voice over Internet Protocol (VoIP) networks.

BACKGROUND OF THE INVENTION

During the call setup process of a VoIP call, the called party receives very limited information about the incoming call, e.g., only the calling party's name and telephone number (primarily consisting of calling party identification data). The calling party also only typically receives a response indicating whether or not the call is accepted (primarily consisting of acceptance data) without receiving further information regarding the call setup status. For instance, the calling party cannot provide the called party additional information regarding the nature of the call and the called party cannot provide the calling party pertinent reasons as to why the incoming call is rejected.

Therefore, a need exists for a method and apparatus for providing user metadata exchange during call setup in a packet network, e.g., a VoIP network.

SUMMARY OF THE INVENTION

In one embodiment, the present invention enables a calling party and a called party to exchange useful information with each other during the call setup process. The user metadata exchange occurs during the call setup process before the call is either accepted or rejected. For example, the method receives user metadata from an originating party, and sends the user metadata provided by the originating party by embedding the user metadata in a Session Initiation Protocol (SIP) signaling message during a call setup.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
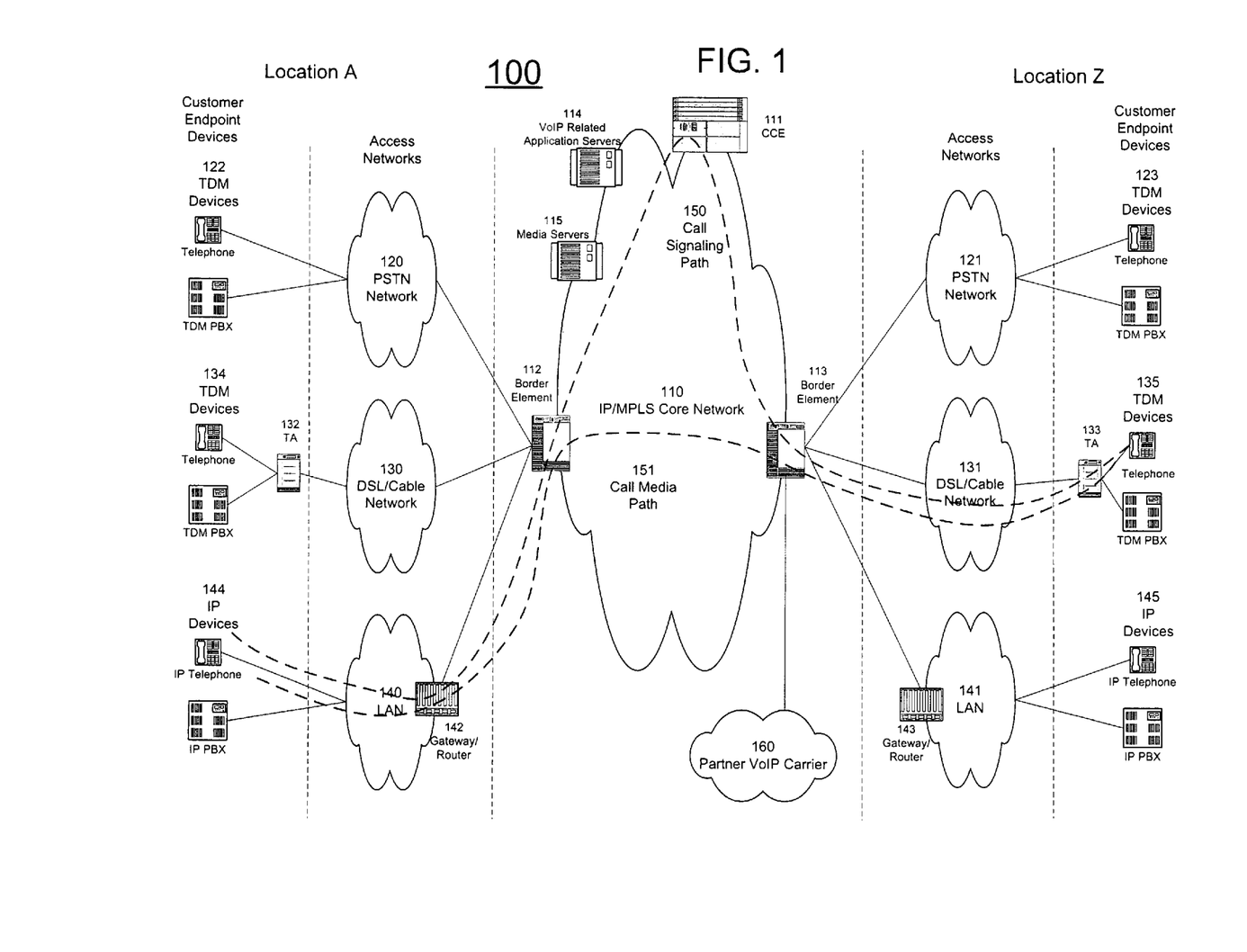
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, teleconference bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

During the call setup process of a VoIP call, the called party receives very limited information about the incoming call and the calling party also typically only receives a response indicating whether or not the call is accepted without receiving further information regarding the call setup status. For instance, the calling party cannot provide the called party additional information regarding the nature of the call and the called party cannot provide the calling party pertinent reasons as to why the incoming call is rejected.

To address this criticality, the present invention enables the calling party and the called party to exchange useful information with each other during the call setup process of a VoIP call. The user metadata exchange during the call setup process before the call is either accepted or rejected. For example, the metadata exchanged enables a called party to decide whether to accept or reject an incoming call and to provide additional information back to the calling party. A calling party is able to send useful information regarding the call to the called party and in turn receive reasons or responses from the called party related to the call. Metadata are data that describe other data. For example, the data "01012007" is meaningless without additional context; however, when the additional metadata classifying "01012007" as a date, with the format of a two digit month, a two digit day, followed by a four digit year, then the data "01012007" becomes meaningful.

Figure 2:
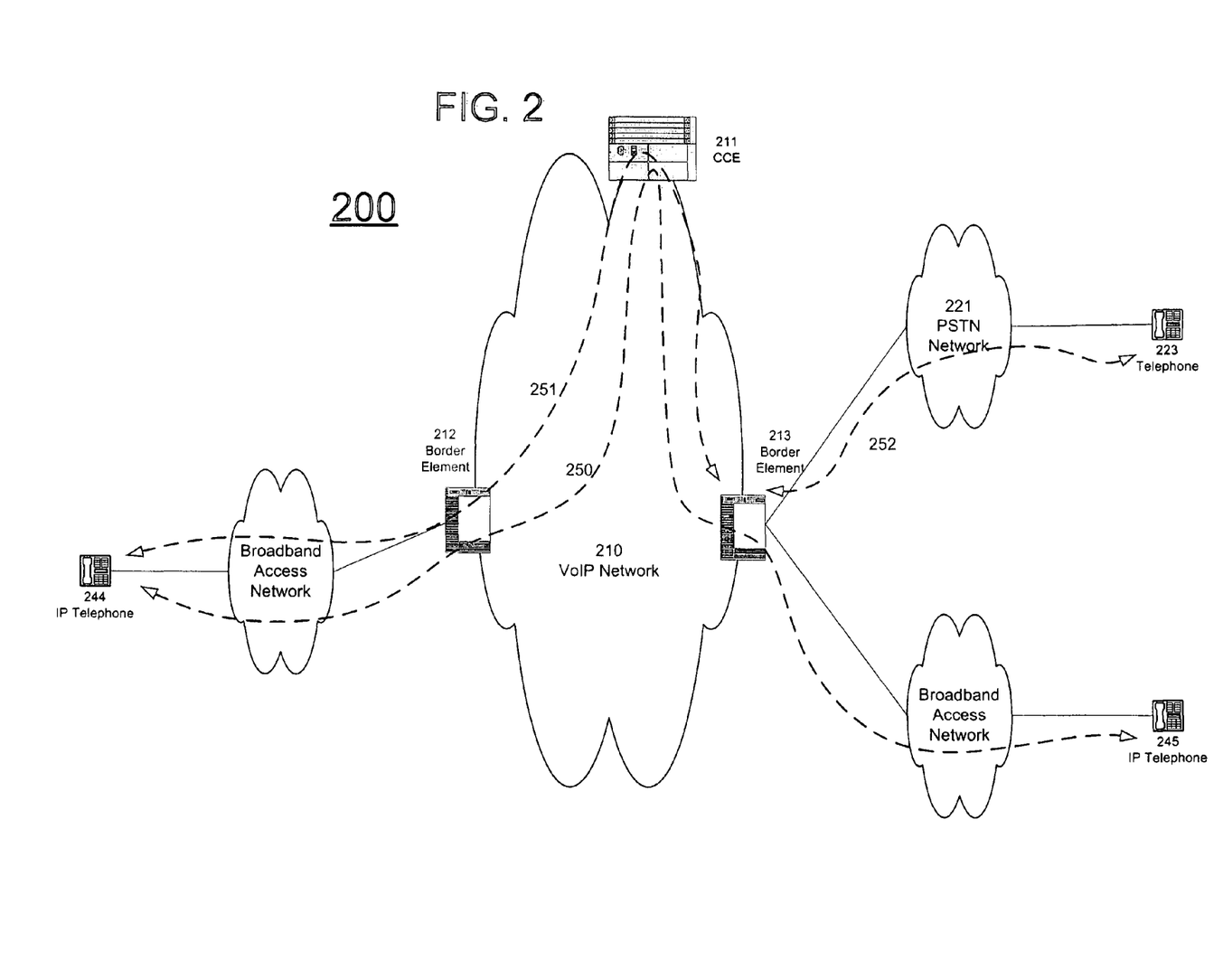
FIG. 2 illustrates an exemplary user metadata exchange during a call setup in a VoIP network of the present invention.

FIG. 2 illustrates an example 200 of user metadata exchange during a call setup in a VoIP network of the present invention. In FIG. 2, a calling party uses a VoIP telephone 244 to make a call to a called party who may use a VoIP telephone 245. Thus, the call is being setup between VoIP telephone 244 and VoIP telephone 245 using signaling flow 250. The calling party sends user metadata via VoIP telephone 244 during the call setup process to the called party indicating the purpose of the call (broadly defined as purpose or intent of the call data). For instance, the calling party can send a call friendly announcement such as "calling about our lunch appointment" to the called party to indicate the intent of the call. In response, the called party who is currently on another call uses VoIP telephone 245 to send user metadata during this call setup process back to the calling party indicating the reason why the call cannot be accepted (broadly defined as reason for non-acceptance of call data) and the response to the calling party message. For instance, the called party can send a friendly denial response such as "sorry, on another call, see you at lunch as scheduled" to the calling party to tell the calling party why the call cannot be answered now and to respond to user friendly announcement sent by the calling party.

Note that user metadata exchanged is sent using a custom "user data" header tag in a SIP command or response signaling message. For example, the SIP command or response signaling messages include, but are not limited to, the following SIP signaling messages:

INVITE;
INFO;
RINGING; and
OK (Call Accepted).

Note also that the custom user data header tag contains XML data broken into nodes that are used to indicate the metadata, such as the type of, user data being exchanged. These nodes include, but are not limited to, the following information or metadata types:

Purpose of call data, e.g., a call announcement used to indicated call intent or purpose, e.g., "calling about lunch";
User description data, e.g., data used to supplement user name, e.g. "Sales Manager, Acme Inc";
User authentication data, e.g., token used to implement automatic call denial or acceptance, e.g., a password;
User image data, e.g., data comprising a still picture or a video clip;
User email address data, e.g., data comprising an email address;

User website Universal Resource Locator (URL) data, e.g., data comprising a user's URL;

User VCard data, e.g., data comprising a virtual business card;

User postal address data, e.g., data comprising a postal address;

User alternate contact data, e.g., data comprising contact information;

User status data, e.g., data used to indicate user's current status, e.g., "at lunch, back at 1 pm"; and Denial response data, e.g., data used to deny a call with a response, e.g., "sorry, I'm on another call".

Specific VoIP endpoint implementations are free to support one or more user metadata nodes as desired. An implementation may simply display data for a node, or may use the data to control further actions, such as storing a VCard in a phone directory, matching a user description or authentication to a call acceptance list.

VoIP implementations can also maintain multiple sets of user metadata for a given user and choose which set to send for a given call in accordance with certain criteria. For instance, a phone may automatically return a different denial response based on the user description of the calling party.

Also, as the user metadata is sent with both the SIP RINGING message and the SIP OK message, a VoIP endpoint can allow the user to present one set of data to a calling party before the call is accepted, and another set, possibly more descriptive one, only to a calling party for which a call is not accepted.

In the previous example, the user metadata is passed along by various VoIP network elements in VoIP network 210 along the signaling path of signaling flow 250 including, but not limited to, BE 212, CCE 211, BE 213, assuming that all network elements along the signaling path support the user metadata exchange. To ensure backward compatibility with network elements not supporting the user metadata exchange, network elements that do not support user metadata exchange can simply discard the user metadata portion embedded within a SIP signaling message and processes the SIP signaling message without the user metadata portion. This is particularly useful if either the called party or the calling party uses a PSTN endpoint.

Referring back to FIG. 2 to further illustrate this point, the caller using VoIP telephone 244 makes a call to a called party using PSTN endpoint, telephone 223. The call is setup using signaling flow 251. When BE 213 receives the call setup message, BE 213, knowing that the call is to be completed using signaling flow 252 via PSTN 221 that does not support user metadata exchange, can simply discard the user metadata portion embedded within the SIP INVITE signaling message and processes the call without the user metadata.

Figure 3:
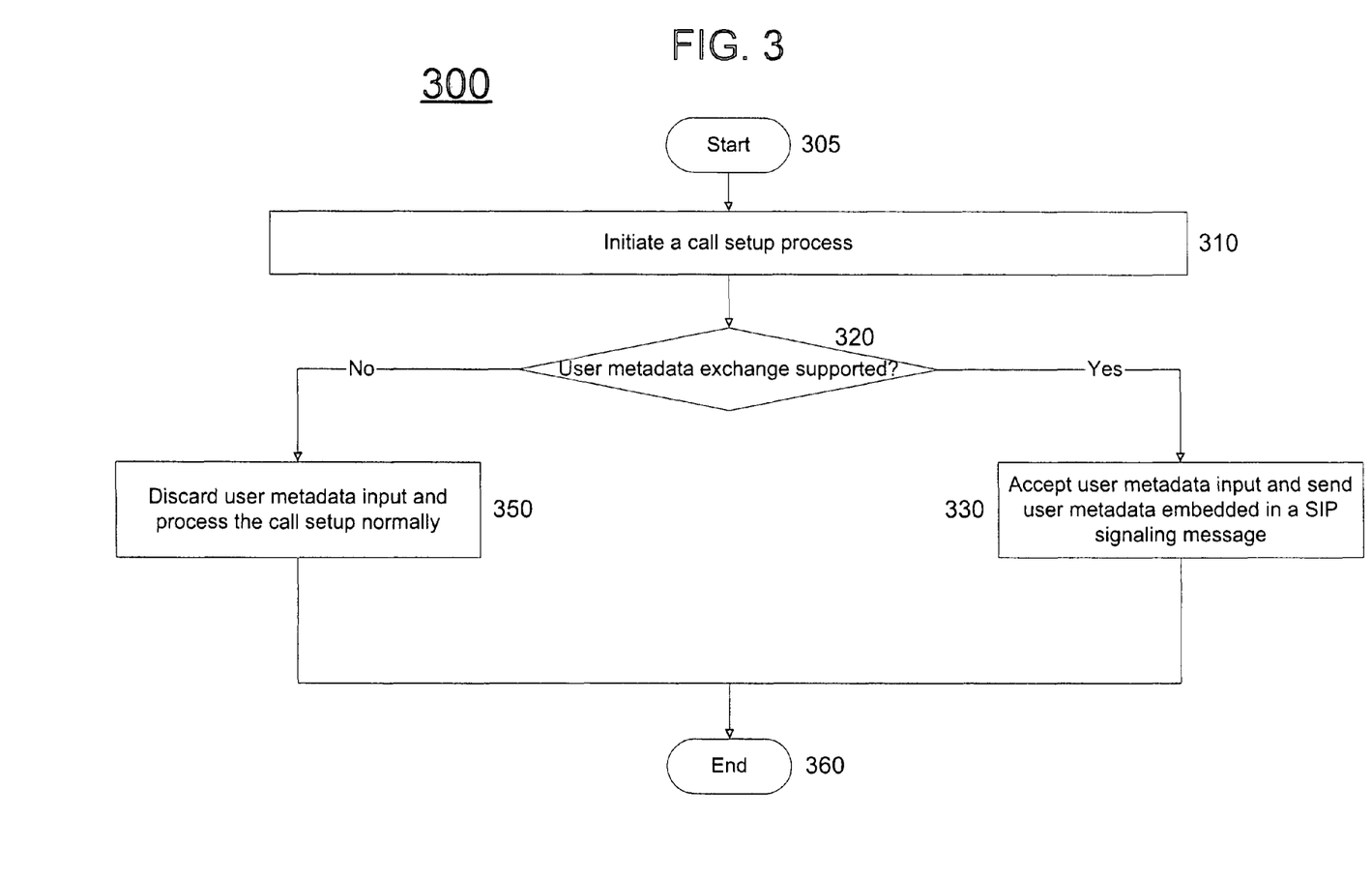
FIG. 3 illustrates a flowchart of a method for sending user metadata exchange during a call setup in a packet network, e.g., a VoIP network, of the present invention.

FIG. 3 illustrates a flowchart of a method 300 for providing user metadata exchange during a call setup in a packet network, e.g., a VoIP network, of the present invention. For example, method 300 is executed by a VoIP endpoint device of a calling party or a called party. Method 300 starts in step 305 and proceeds to step 310.

In step 310, the method initiates a call setup process. For instance, a call is made by a calling party to a called party.

In step 320, the method checks if user metadata exchange is supported by the VoIP endpoint device. If user metadata exchange is supported by the VoIP endpoint device, the method proceeds to step 330; otherwise, the method proceeds to step 350.

In step 330, the method accepts the user metadata input by a user (e.g., an originating party), either by the calling party if the endpoint device is the calling party VoIP endpoint or the called party if the endpoint is the called party VoIP endpoint, and sends the user metadata in an appropriate SIP signaling message depending on the current stage of the call setup process. For instance, a calling party can send user metadata in a SIP INVITE or a SIP INFO signaling message to a called party, and a called party can send user metadata in a SIP RINGING or a SIP OK signaling message.

In step 350, the method discards the user metadata input by a user, either by the calling party if the endpoint device is the calling party VoIP endpoint or the called party if the endpoint is the called party VoIP endpoint, and processes the call setup normally without any user metadata. The method ends in step 360.

Figure 4:
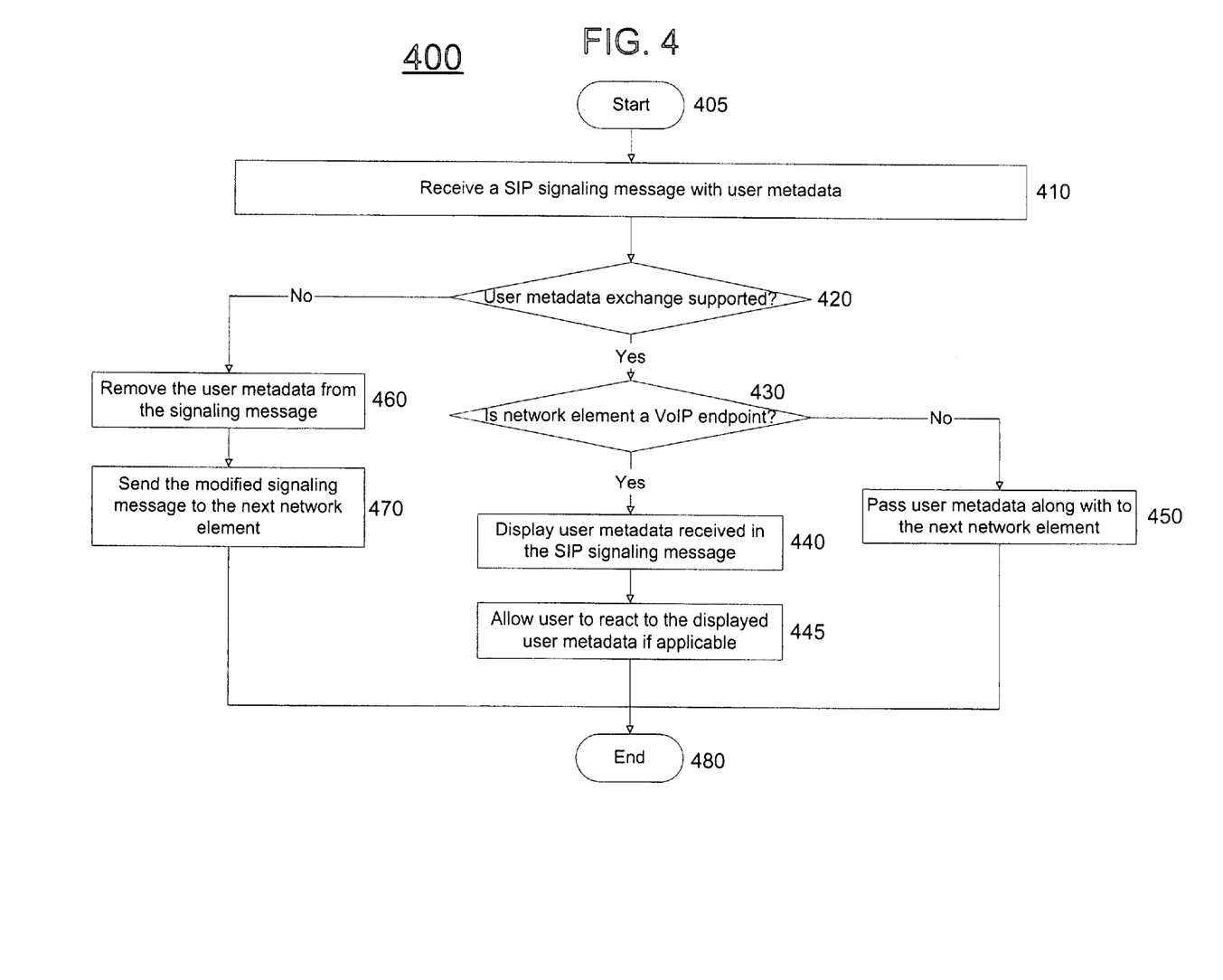
FIG. 4 illustrates a flowchart of a method for receiving user metadata exchange during a call setup in a packet network, e.g., a VoIP network, of the present invention.

FIG. 4 illustrates a flowchart of a method 400 for receiving user metadata exchange during a call setup in a packet network, e.g., a VoIP network, of the present invention. For example, method 400 is executed by a VoIP endpoint of a calling party or a called party, or a VoIP network element within a VoIP network. Method 400 starts in step 405 and proceeds to step 410.

In step 410, the method receives a SIP signaling message with embedded user metadata. Note that the SIP signaling message includes, but is not limited to, INVITE, INFO, RINGING, or OK signaling message.

In step 420, the method checks if user metadata exchange is supported by a VoIP endpoint or a VoIP network element. If user metadata exchange is supported by a VoIP endpoint or a VoIP network element, the method proceeds to step 430; otherwise, the method proceeds to step 460.

In step 430, the method checks if the network element is a VoIP endpoint. If the network element is a VoIP endpoint, the method proceeds to step 440; otherwise, the method proceeds to step 450.

In step 440, the method displays the user metadata received within the SIP signaling message on the VoIP endpoint device.

In step 445, the method allows a user to react to the displayed user metadata if applicable, such as responding accordingly to a received user metadata message or storing the received user metadata if so desired. For instance, a called party can send a response to a received user metadata message back to a calling party.

In step 450, the method passes along the user metadata received to the next network element along the signaling path of the signaling flow.

In step 460, the method removes the received user metadata from the received signaling message.

In step 470, the method sends the modified signaling message without the user metadata to the next network element along the signaling path. The method ends in step 480.

Figure 5:
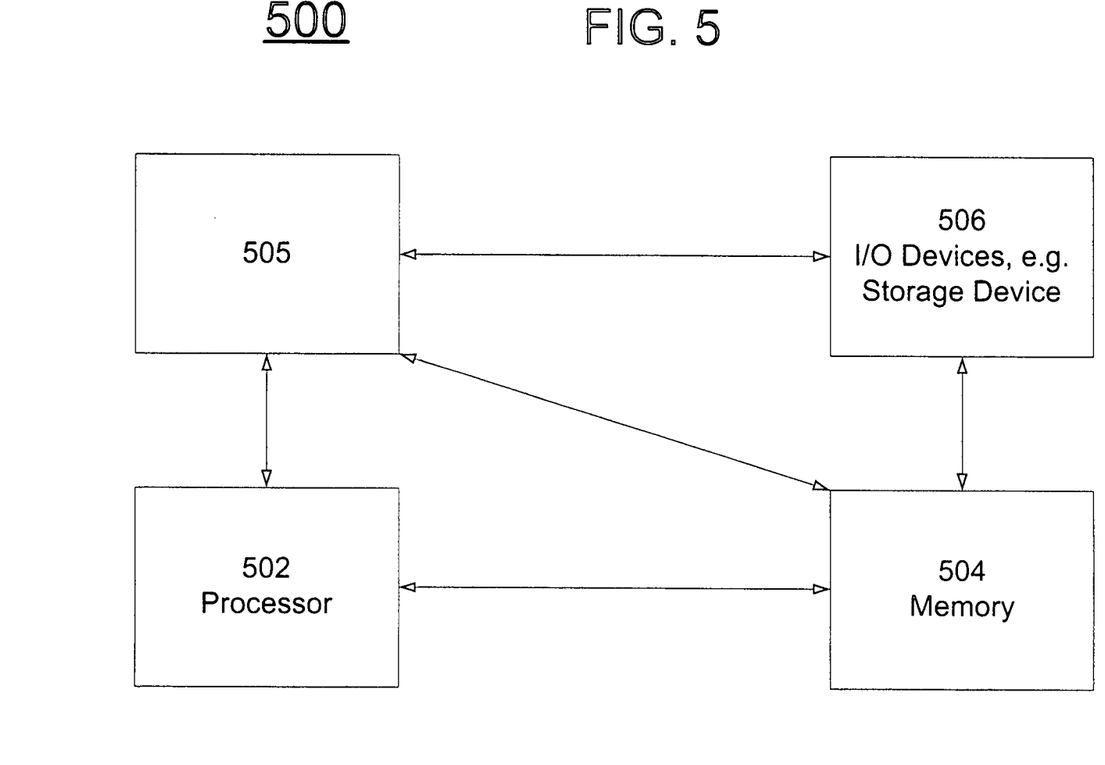
FIG. 5 illustrates a high level block diagram of a general purpose computer suitable for use in performing the functions described herein.

FIG. 5 depicts a high level block diagram 500 of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing user metadata exchange during a call setup, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for providing user metadata exchange during a call setup can be loaded into memory 504 and executed by processor 502 to implement the functions as discussed above. As such, the present process 505 for providing user metadata exchange during a call setup (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for sending user metadata in a communication network, comprising:
    receiving, by a processor, the user metadata from an originating party, wherein the user metadata comprises purpose of call data, wherein the processor comprises a processor of a user endpoint device of the originating party;
    sending, by the processor, the user metadata from the originating party to a user endpoint device of a called party by embedding the user metadata in a first session initiation protocol signaling message during a call setup, wherein the first session initiation protocol signaling message comprises a session initiation protocol invite signaling message, wherein the user metadata from the originating party is provided in a user data header tag of the first session initiation protocol signaling message, wherein the user data header tag comprises extensible markup language data broken into a plurality of nodes that are embedded in the first session initiation protocol signaling message, wherein a different one of a plurality of different user data types is assigned to each node, wherein the purpose of call data is assigned to a first node of the plurality of nodes and wherein user authentication data of the originating party is assigned to a second node of the plurality of nodes, wherein the purpose of call data is for being displayed by the user endpoint device of the called party and wherein the user authentication data of the originating party is for being used by the user endpoint device of the called party to determine whether to accept or deny the call setup based upon the user authentication data of the originating party; and
    receiving, by the processor, a response message from the user endpoint device of the called party responding to the user metadata from the originating party, wherein the response message comprises user metadata from the called party embedded in a second session initiation protocol signaling message, wherein the user metadata from the called party comprises denial response data when the user endpoint device of the called party determined to deny the call based upon the user authentication data of the originating party, wherein the denial response data is selected from a plurality of possible denial response data based upon the user authentication data of the originating party; and
    displaying, by the processor, the user metadata from the called party.

2. The method of claim 1, wherein the communication network is a voice over internet protocol network.

3. The method of claim 1, further comprising:
    removing the user metadata from the originating party from the first session initiation protocol signaling message when a processing network element does not support user metadata.

4. The method of claim 1, wherein the second session initiation protocol signaling message comprises a session initiation protocol OK signaling message.

5. A non-transitory computer-readable medium storing instructions which, when executed by a processor, cause the processor to perform operations for sending user metadata in a communication network, the operations comprising:
    receiving the user metadata from an originating party, wherein the user metadata comprises purpose of call data, wherein the processor comprises a processor of a user endpoint device of the originating party;
    sending the user metadata from the originating party to a user endpoint device of a called party by embedding the user metadata in a session initiation protocol signaling message during a call setup, wherein the first session initiation protocol signaling message comprises a session initiation protocol invite signaling message, wherein the user metadata from the originating party is provided in a user data header tag of the first session initiation protocol signaling message, wherein the user data header tag comprises extensible markup language data broken into a plurality of nodes that are embedded in the first session initiation protocol signaling message, wherein a different one of a plurality of different user data types is assigned to each node, wherein the purpose of call data is assigned to a first node of the plurality of nodes and wherein user authentication data of the originating party is assigned to a second node of the plurality of nodes, wherein the purpose of call data is for being displayed by the user endpoint device of the called party and wherein the user authentication data of the originating party is for being used by the user endpoint device of the called party to determine whether to accept or deny the call setup based upon the user authentication data of the originating party;
    receiving a response message from the user endpoint device of the called party responding to the user metadata from the originating party, wherein the response message comprises user metadata from the called party embedded in a second session initiation protocol signaling message, wherein the user metadata from the called party comprises denial response data when the user endpoint device of the called party determined to deny the call based upon the user authentication data of the originating party, wherein the denial response data is selected from a plurality of possible denial response data based upon the user authentication data of the originating party; and
    displaying the user metadata from the called party.

6. The non-transitory computer-readable medium of claim 5, wherein the communication network is a voice over internet protocol network.

7. The tangible non-transitory computer-readable medium of claim 5, further comprising:
    removing the user metadata from the originating party from the first session initiation protocol signaling message when a processing network element does not support user metadata.

8. An apparatus for sending user metadata in a communication network, comprising:
    a processor of a user endpoint device of an originating party; and a computer-readable medium storing instructions which, when executed by the processor, cause the processor to perform operations, the operations comprising:
receiving the user metadata from the originating party, wherein the user metadata comprises purpose of call data;
sending the user metadata from the originating party to a user endpoint device of a called party by embedding the user metadata in a first session initiation protocol signaling message during a call setup, wherein the first session initiation protocol signaling message comprises a session initiation protocol invite signaling message, wherein the user metadata from the originating party is provided in a user data header tag of the first session initiation protocol signaling message, wherein the user data header tag comprises extensible markup language data broken into a plurality of nodes that are embedded in the first session initiation protocol signaling message, wherein a different one of a plurality of different user data types is assigned to each node, wherein the purpose of call data is assigned to a first node of the plurality of nodes and wherein user authentication data of the originating party is assigned to a second node of the plurality of nodes, wherein the purpose of call data is for being displayed by the user endpoint device of the called party and wherein the user authentication data of the originating party is for being used by the user endpoint device of the called party to determine whether to accept or deny the call setup based upon the user authentication data of the originating party;
receiving a response message from the user endpoint device of the called party responding to the user metadata from the originating party, wherein the response message comprises user metadata from the called party embedded in a second session initiation protocol signaling message, wherein the user metadata from the called party comprises denial response data when the user endpoint device of the called party determined to deny the call based upon the user authentication data of the originating party, wherein the denial response data is selected from a plurality of possible denial response data based upon the user authentication data of the originating party; and
displaying the user metadata from the called party.

9. The apparatus of claim 8, wherein the communication network is a voice over internet protocol network.

\* \* \* \* \*